(12) United States Patent
Hines et al.

(10) Patent No.: US 6,461,052 B1
(45) Date of Patent: Oct. 8, 2002

(54) OPTICAL FIBER MANAGEMENT MODULE ASSEMBLY

(75) Inventors: Michael J. Hines, Ivoryton, CT (US); Stewart A. Levesque, Scotland, CT (US); Suzanne L. Spera, Groton, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 09/528,210

(22) Filed: Mar. 17, 2000

(51) Int. Cl.[7] .................................................. G02B 6/36
(52) U.S. Cl. ............................ 385/53; 385/59; 385/60; 385/71; 385/135
(58) Field of Search .............................. 385/53, 59, 55, 385/56, 58, 60, 70–73, 134, 135

(56) References Cited

U.S. PATENT DOCUMENTS

| | | |
|---|---|---|
| 3,644,922 A | 2/1972 | James et al. |
| 3,819,442 A | 6/1974 | Brashenko |
| 3,989,578 A | 11/1976 | Hashimoto |
| 4,029,390 A | 6/1977 | Chinnock et al. |
| 4,046,454 A | 9/1977 | Pugh |
| 4,088,386 A | 5/1978 | Hawk |
| 4,102,561 A | 7/1978 | Hawk et al. |
| 4,111,522 A | 9/1978 | Auracher et al. |
| 4,142,776 A | 3/1979 | Cherin et al. |
| 4,147,404 A | 4/1979 | Hensel |
| 4,247,163 A | 1/1981 | Lumpp et al. |
| 4,253,730 A | 3/1981 | Logan et al. |
| 4,254,865 A | 3/1981 | Pacey et al. |
| 4,359,262 A | 11/1982 | Dolan |
| 4,427,879 A | 1/1984 | Becher et al. |
| 4,489,830 A | 12/1984 | Charlebois et al. |
| 4,588,257 A | 5/1986 | Maranto |
| 4,708,430 A | 11/1987 | Donaldson et al. |
| 4,719,321 A | 1/1988 | Kozel et al. |
| 4,753,515 A | 6/1988 | Sato et al. |
| 4,772,086 A | 9/1988 | Bellerby et al. |
| 4,773,726 A | 9/1988 | Ito |
| 4,911,662 A | 3/1990 | Debortoli et al. |
| 4,923,275 A | 5/1990 | Kaukeinen |
| 5,115,260 A | 5/1992 | Hayward et al. |
| 5,121,459 A | 6/1992 | Chiang |
| 5,146,532 A | 9/1992 | Hodge |
| 5,274,729 A * | 12/1993 | King et al. .................. 385/134 |
| 5,363,466 A | 11/1994 | Milanowski et al. |
| 5,377,286 A | 12/1994 | Iida et al. |
| 5,487,123 A | 1/1996 | Fowble |
| 5,511,144 A | 4/1996 | Hawkins et al. |
| 5,530,783 A * | 6/1996 | Belopolsky et al. .......... 385/53 |
| 5,559,922 A | 9/1996 | Arnett |
| 5,625,737 A | 4/1997 | Saito |
| 6,220,763 B1 * | 4/2001 | Stephenson .................. 385/73 |
| 6,240,229 B1 * | 5/2001 | Roth ............................ 385/53 |
| 6,307,997 B1 * | 10/2001 | Walters et al. .............. 385/134 |

* cited by examiner

Primary Examiner—Hemang Sanghavi
(74) Attorney, Agent, or Firm—Cummings & Lockwood

(57) ABSTRACT

An optical fiber management module assembly for mounting in a patch panel aperture and includes an adapter having a housing portion at its proximal end providing a cavity dimensioned and configured to seat the proximal end of a jack therein and having a channel portion at the other end providing a channel leading into the cavity. The housing portion has arms which engage the patch panel. Engaged with the distal end of the adapter is a projecting arm of a fiber management clip having an engagement portion at its proximal end with side walls defining a recess for the distal end of the jack. The clip also has a guidance portion at its other end thereon with channels extending longitudinally thereof in which optical fibers may be seated, and a latch extending over the channels and engaged with the guidance portion to retain the fibers in the channels.

22 Claims, 7 Drawing Sheets

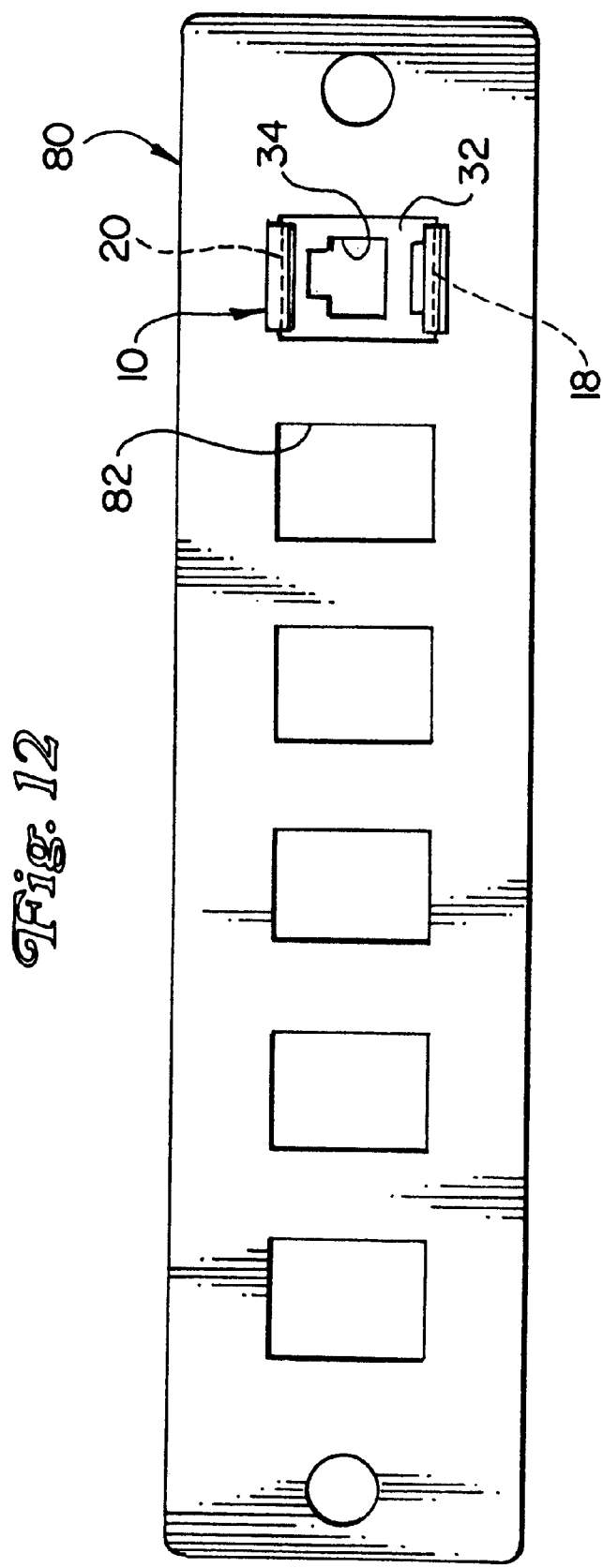

OPTICAL FIBER MANAGEMENT MODULE ASSEMBLY

BACKGROUND OF THE INVENTION

The present invention relates to fiber optic connectors and, more particularly, to devices for mounting fiber optic jacks in a patch panel or like device.

Patch panels and like cabinetry are widely employed in communication systems to facilitate connections along various distribution paths. For use with such panels, jacks have been designed to mount easily into the apertures of the patch panel to receive plugs from other points in the communications network.

As the use of fiber optics has increased in such networks, various jacks and plugs have been developed for use therewith. Frequently, these will not fit in the standard patch panels which have been utilized for copper cable distribution systems. Since many systems employ both wire and fiber pathways, it is desirable to adapt optical fiber jacks for mounting in the apertures of the standard patch panels which are extensively utilized in existing installations.

Moreover, some of the jacks developed for use with optical fibers have been intended for use with only a single fiber. More recently, there has been growing use of jacks which would receive two fibers and therefore greatly increase the capacity of the distribution system.

Moreover, another problem arises in the use of optical fiber connectors, namely the need to minimize the strain on the fiber optic elements at the points of connection to the jacks and the jacks to the patch panels. It will be appreciated that excessive strain or curvature or crushing forces could injure the fiber and destroy the efficiency of transmission. Thus, there has been an increasing need for adapters which would enable the use of the various types of jacks in standard and existing patch panels and cabinetry.

It is an object of the present invention to provide a novel fiber management module assembly for use with existing patch panels and like cabinetry.

It is also an object to provide such an optical fiber management module assembly which supports the optical fibers at their point of connection to the jack and to the patch panel in a manner which will reduce strain and potential injury to the optical fibers.

Another object is to provide such an optical fiber management module assembly which can be quickly and easily fabricated at relatively low cost.

Still another object is to provide such an optical fiber management module assembly which can be readily assembled with an existing jack for mounting of that jack in existing patch panels and like cabinetry.

SUMMARY OF THE INVENTION

It has now been found that the foregoing and related objects may be readily attained in an optical fiber management module assembly for mounting in a patch panel aperture. The assembly includes an adapter having a housing portion at its proximal end providing a cavity dimensioned and configured to seat the proximal end of a jack therein, and having a channel portion at the other end providing a channel leading into the cavity. The housing portion has a pair of arms extending forwardly from the end of the cavity for passage into an aperture in the patch panel and engageable with the wall of the patch panel about the aperture to mount the adapter on the patch panel.

A fiber management clip has an engagement portion at its proximal end with a projecting arm engaged with the other end of the adapter. The engagement portion has side walls defining a recess for the distal end of the jack, and a guidance portion at the other end of the clip has channels extending longitudinally thereof in which optical fibers may be seated and led into the jack. A latch on the guidance portion extends over the channels and is engaged with the guidance portion to retain the fibers in the channels.

In its preferred form, each of the pair of arms has a lip portion at the proximal end thereof with the lip portions extending oppositely and being engageable with the wall of the patch panel. The housing portion has top, bottom and side walls and the pair of arms are preferably disposed on the bottom and top walls. At least one of the top wall and the bottom wall has slits extending therein from the proximal end thereof to provide flexure for the associated arm and to facilitate insertion of the arm into the patch panel aperture. The bottom wall of the housing portion has an arm extending distally therefrom for engagement with a jack seated therein.

Preferably, the channel portion of the housing portion has a bottom wall and side walls, and the bottom wall has an aperture therein adjacent the distal end thereof, and the projecting arm of the fiber management clip has a lip thereon which is engageable in the aperture in the bottom wall.

Desirably, the guidance portion of the fiber management clip is upwardly offset from the engagement portion, and it has a generally horizontal portion adjacent the engagement portion and a downwardly inclined portion spaced therefrom. The latch of the fiber management clip is integrally formed with the guidance portion, and the latch projects from one side of the guidance portion and is hinged to the one side and foldable over the channels.

Preferably, the latch has a leg portion at its free end extending along the opposite side of the guidance portion, and the leg portion has an aperture adjacent its free end. The opposite side of the guidance portion has a boss thereon which is frictionally seated in the aperture.

BRIEF DESCRIPTION OF THE PREFERRED EMBODIMENTS

FIG. 12 is a front view of a patch panel in which the module of FIG. 1 has been mounted.

DETAILED DESCRIPTION OF THE PREFERRED EMBODIMENTS

Figure 1:
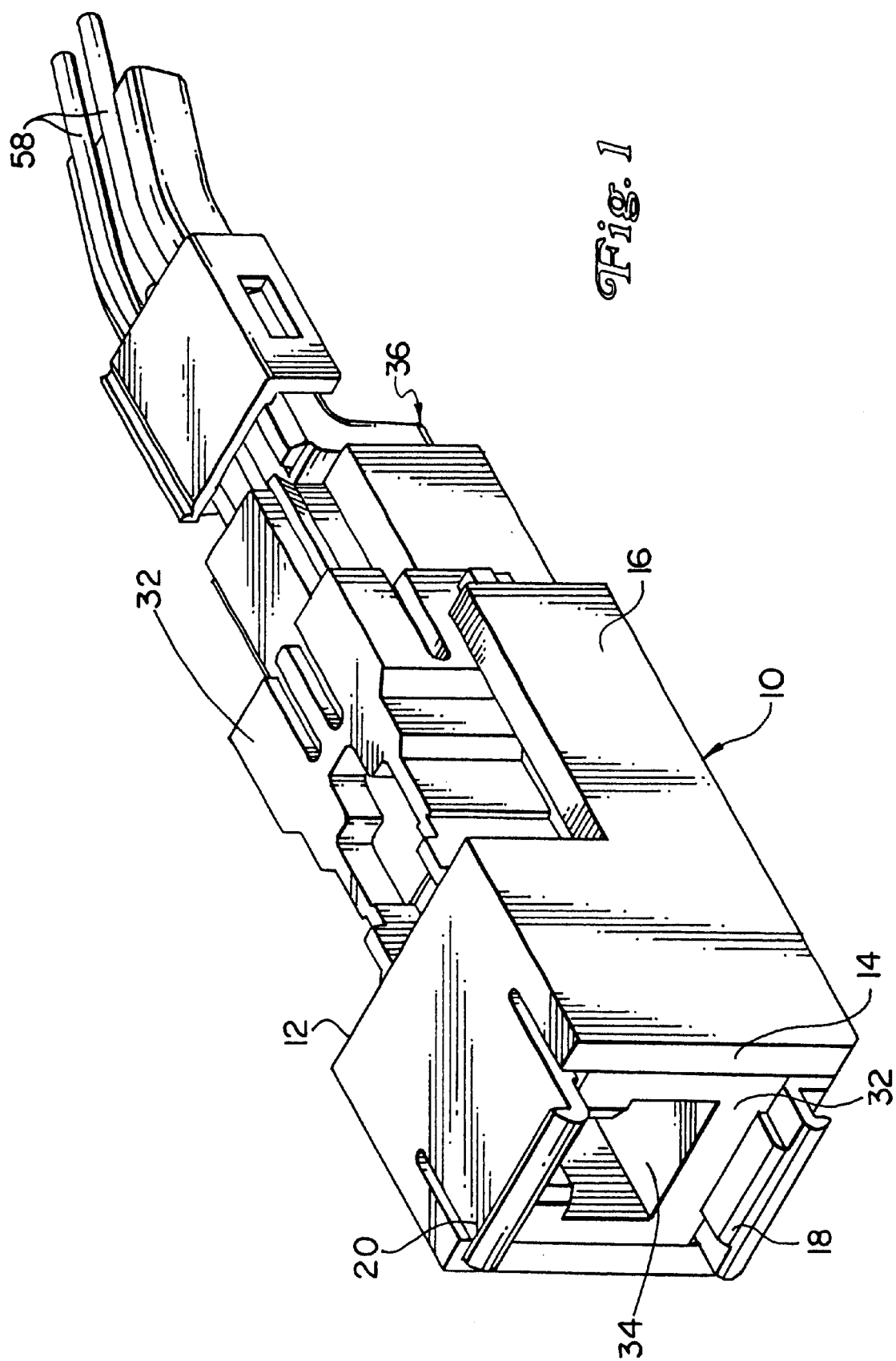
FIG. 1 is a perspective view of an assembled optical fiber management module embodying the present invention and with a jack seated therein to which optical fibers are connected.
Figure 2:
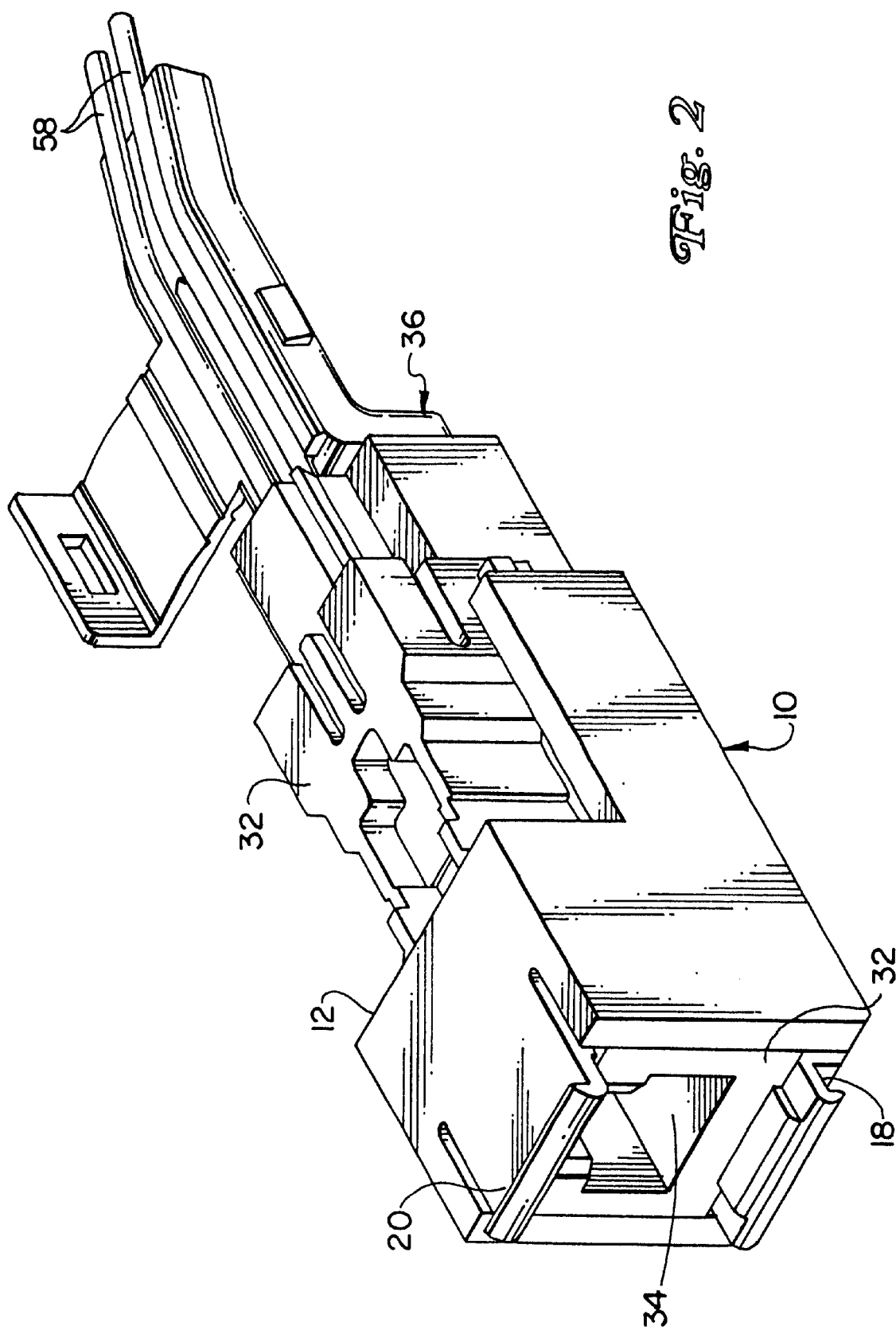
FIG. 2 is a view similar to FIG. 1 but with the latch disengaged.
Figure 3:
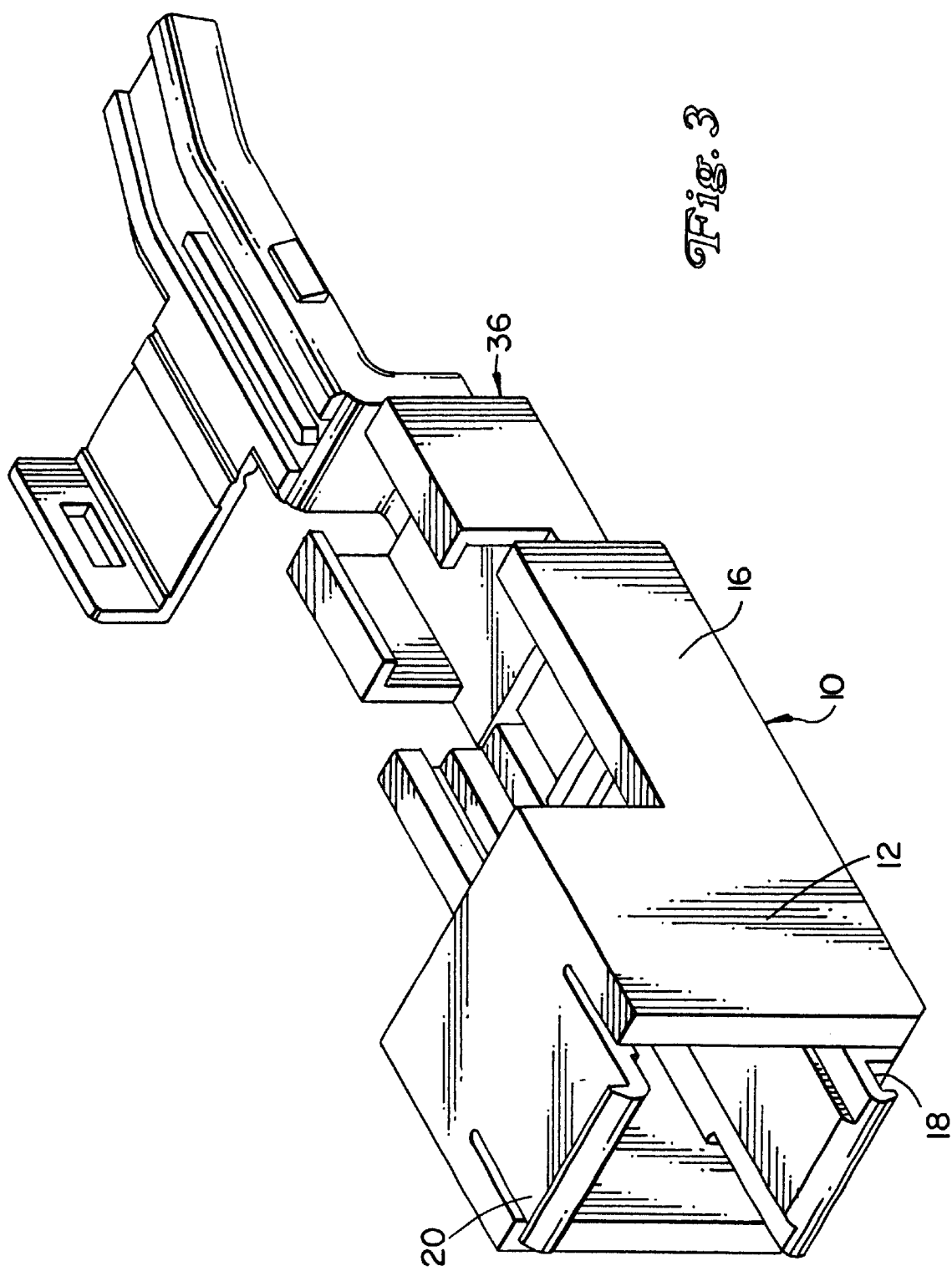
FIG. 3 is a view similar to FIG. 2 but with the jack and optical fibers removed.
Figure 4:
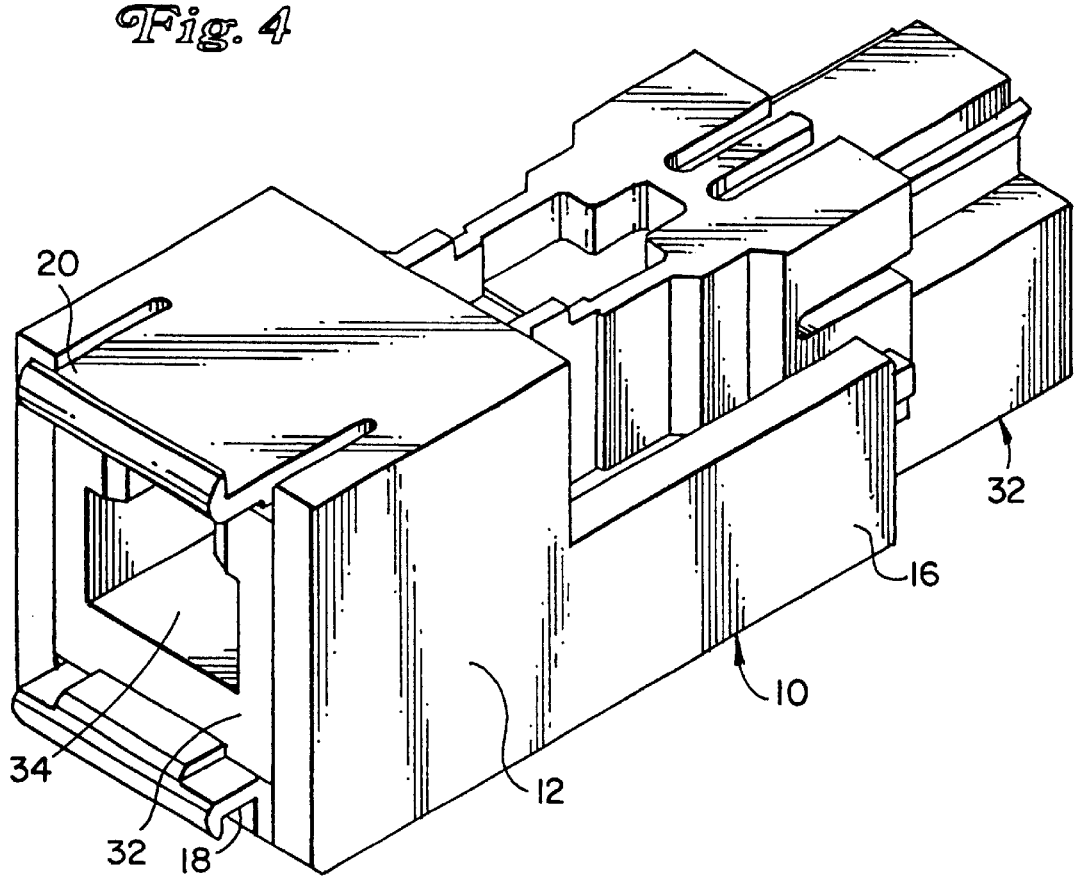
FIG. 4 is a perspective view of the adapter and jack of FIG. 1 but with the fiber management clip and optical fibers removed.

Turning first to FIG. 1, therein illustrated is an optical fiber management module embodying the present invention and comprised of an adapter generally designated by the numeral 10 and a fiber management clip generally designated by the numeral 36. Seated in the module is a jack generally designated by the numeral 32, and a pair of optical fibers 58 are guided in the clip 36 and secured in the jack 32.

As can be seen in FIG. 1, the proximal end of the jack 32 with its plug receiving aperture 34 is disposed at the proximal end of the adapter 10. As seen in FIG. 12, the proximal end of the adapter 10 seats in one of the apertures 82 of the patch panel generally designated by the numeral 80.

Figure 5:
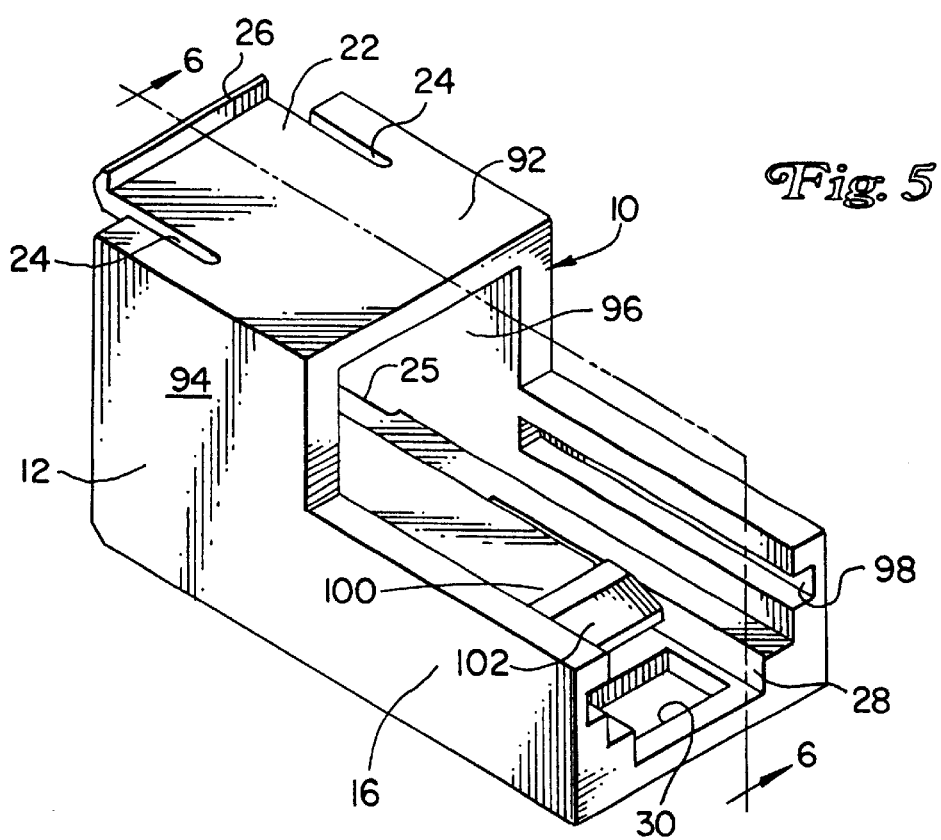
FIG. 5 is a perspective view of the adapter of FIG. 1.
Figure 6:
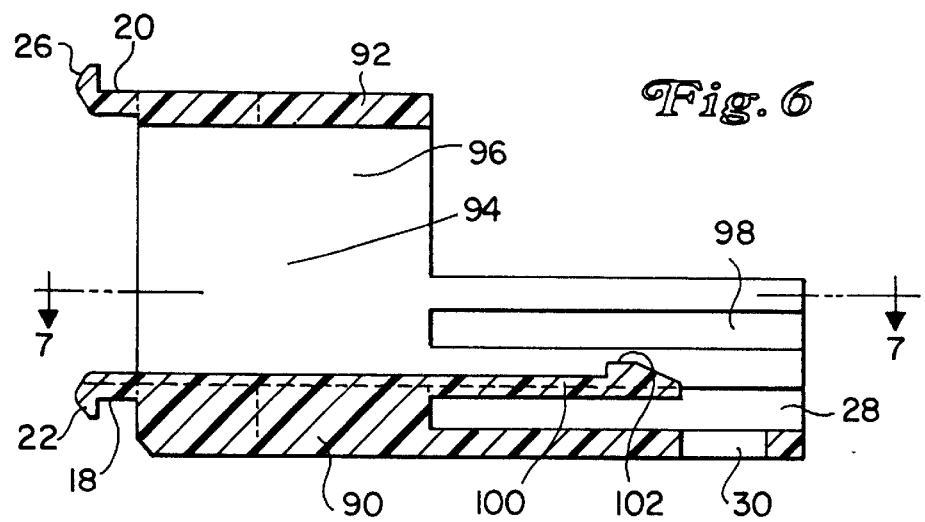
FIG. 6 is a longitudinal sectional view of the adapter along the line 6—6 of FIG. 5.
Figure 7:
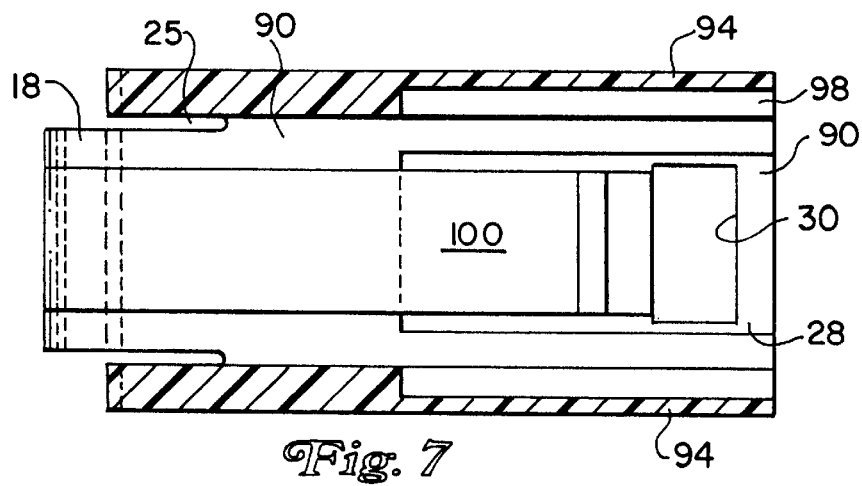
FIG. 7 is a longitudinal sectional view of the adapter along the line 7—7 of FIG. 5.
Figure 8:
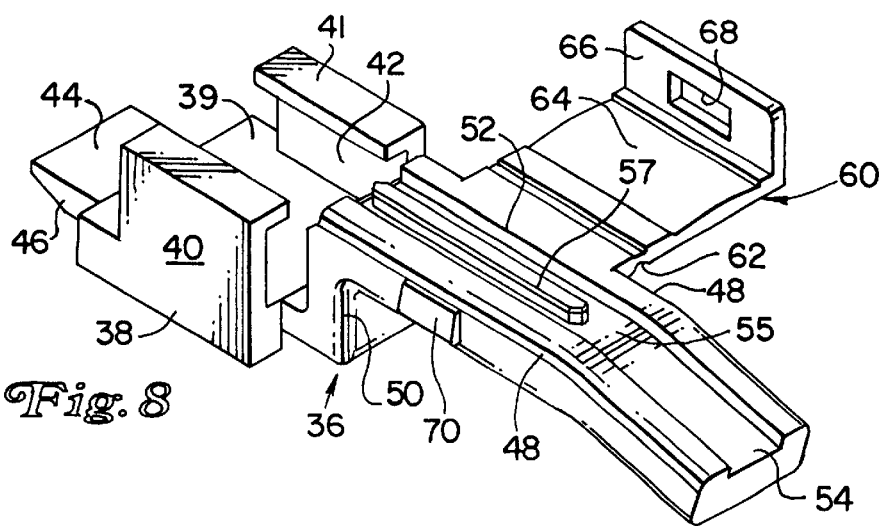
FIG. 8 is a perspective view of the fiber management clip of FIG. 1 prior to assembly.
Figure 9:
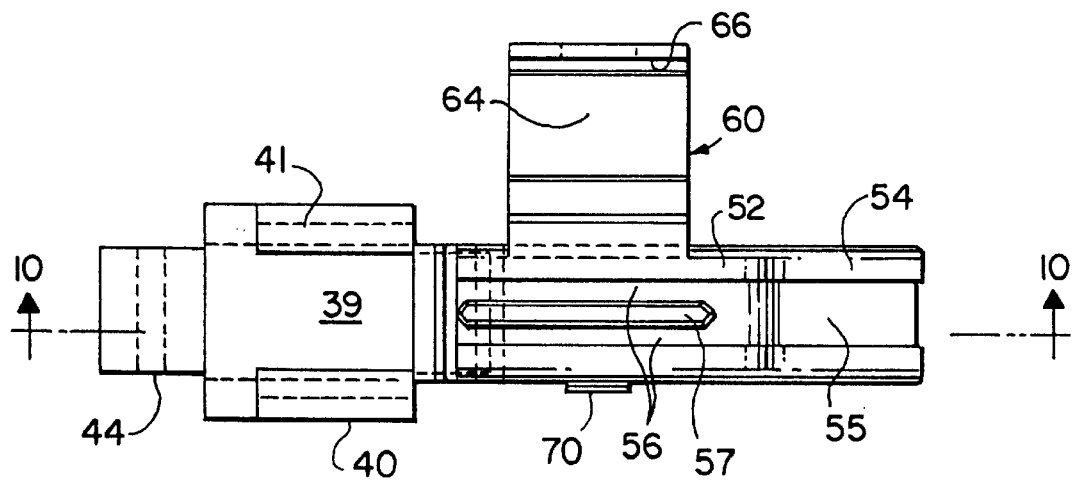
FIG. 9 is a plan view of the fiber management clip of FIG. 8.
Figure 10:
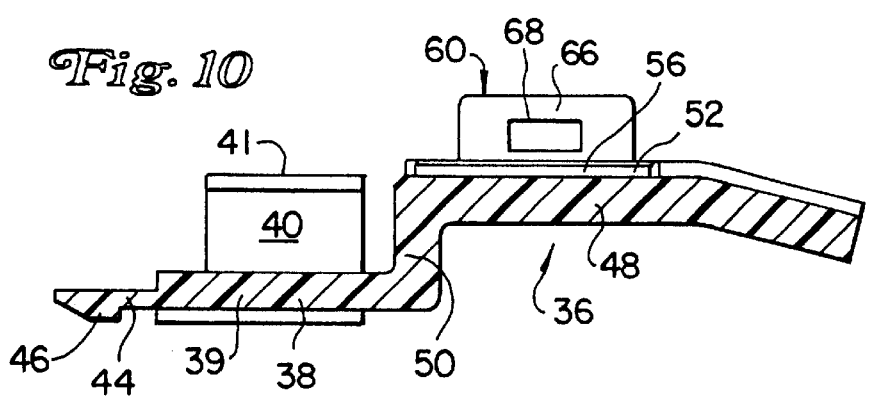
FIG. 10 is a longitudinal sectional view of the fiber management clip along the line 10—10 of FIG. 9.
Figure 11:
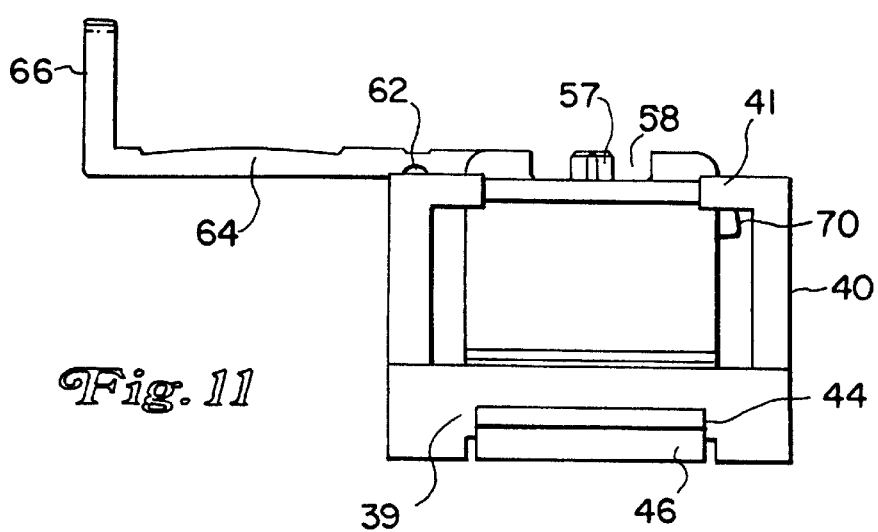
FIG. 11 is an end elevational view of the fiber management clip.

Turning next in detail to the construction of the adapter, as best seen in FIGS. 5–7, it is comprised of a housing portion 12 at its proximal or engaging end 14 and a channel portion 16 at its distal end. The housing portion 12 has a bottom wall 90, top wall 92 and side walls 94 which define a rectangular cavity 96.

The top wall 92 has a forwardly projecting arm 20 with an upstanding lip 26 at its free end and slots 24 extend into the body of the housing portion 12 to provide flexure for the arm 20. The bottom wall also has a forwardly projecting arm 18 with a depending lip 22 and slots 25 extend into the body to provide flexure for the arm 18.

The channel portion 16 has a continuation of the bottom wall 90 with a longitudinally extending recess 28 which extends to the distal end of the adapter 10. The side walls 94 are reduced in height from those of the housing portion 12 and have grooves 98 on their inner surface extending longitudinally thereof. Adjacent the distal end, the bottom wall 90 has an aperture 30.

Extending distally or rearwardly from the housing portion 12 and over the recess 28 in the channel portion 16 is a projecting arm 100 with an upstanding lip 102 at its distal or free end.

When the jack 32 is inserted into the channel portion 16 and pushed into the cavity 96 of the housing portion 12, ribs (not shown) on the jack slide in the grooves 98 and the arm 100 is deflected until the jack 32 is fully seated and the lip 102 snaps behind a shoulder (not shown) on the jack 32 to secure it in the adapter 10.

As seen in FIG. 12, the adapter 10 is seated in the aperture 82 of the patch panel 80 by deflecting the lower arm 18 downwardly to engage the lip 22 of the lower arm over the face of the panel 80 and then allowing the upper arm 20 to return to its normal position which engages its lip 26 over the face of the panel 80.

Turning now in detail to the structure of the fiber management clip 36 as seen in FIGS. 8–11, it is a unitary structure with an engagement portion 38 at its proximal end and a guidance portion 48 at its distal end which are joined by a vertical offset portion 50. The engagement portion 38 has a bottom wall 39 and side walls 40 with opposed flanges 41 which define a channel 42 dimensioned and configured to seat the distal end of the jack 32. Projecting forwardly or proximally from the bottom wall 39 is a projecting arm 44 with a depending lip 46. When the clip 36 is assembled to the adapter 10, the arm 44 deflects and slides along the bottom of the recess 28 until its lip 46 snaps into the aperture 30, thus securing the two components in assembly.

The guidance portion 48 has a horizontal section 52 adjacent the engagement portion 38 and a downwardly inclined section 54 spaced therefrom. A recess 55 in the upper surface extends over the length of the guidance portion with an upstanding central rib 57 providing a pair of longitudinally extending channels 56 in the horizontal section 52.

Integrally formed with the horizontal section 52 is a latch arm generally designated by the numeral 60. As can be seen, as formed it projects from one side normally to the channels 56 and has a hinge groove 62 in its lower surface. At the outer or free end of the strap portion 64 is a latch portion 66 which extends normally thereto and it has a rectangular latch aperture 68 formed therein.

The side surface of the horizontal section 52 on the opposite side is formed with a rectangular boss 70 which is cooperatively dimensioned to seat in the latch aperture 68. As seen, the boss 70 has an inclined surface to facilitate flexible movement of the latch portion 66 thereover until the latch portion 66 snaps over the boss 70.

As seen in FIG. 1, the optical fibers 58 are disposed in the channels 56 and, when the latch arm 60 is engaged, they are securely retained therein. The channels 56 are cooperatively dimensioned with the optical fibers 58 so that the fibers are not subjected to crushing pressure while being guided in the channels 56 so as to minimize strain on the fibers 58.

It would be readily appreciated that the adapter portion of the modular assembly can be modified in internal dimensions and configuration to accommodate different jacks while maintaining the exterior dimensions required for existing patch panels and like cabinetry.

The components of the modular assembly are readily fabricated by injection molding from various synthetic resins. Polypropylene has proven to be highly satisfactory for this purpose particularly in view of its self-hinging properties and the flexibility provided for the arms which are used to effect engagement of the components.

It will be noted that each of the arms used to effect engagement of the respective elements has a tapering leading surface to facilitate movement of the arm along or over the cooperating surface and into engagement.

If so desired, the rib and channels in the guidance portion of the clip may extend downwardly along the sloping section. Although the channels can vary in dimension depending upon the diameter of the fibers to be seated therein, a channel having a width and height of about 0.030 inch will generally accommodate optical fibers up to 900 microns in diameter and even somewhat larger without putting any stress or strain upon the fibers.

In use of the modular assembly of the present invention, it is customary to insert the adapter into the aperture of the patch panel. The jack is then inserted into the adapter and secured therein and thereafter the wire management clip can be mounted therebehind. The optical fibers are thus guided into the passages in the jack. Thus, this entire assembly can be rapidly inserted into the patch panel aperture to provide the ultimate mounting.

Thus, it can be seen from the foregoing detailed description and attached drawings that the fiber management module assembly of the present invention provides a simple and highly effective mounting for jacks of various size in existing patch panels and like cabinetry. The components of the assembly can be fabricated readily and economically and assembled easily with the jack. The housing which receives the jack can be customized for different sizes and configurations of jacks while obtaining all of the advantages of a system which will minimize strain and potential injury to the optical fibers.

Having thus described said invention, what is claimed is:

1. An optical fiber management module assembly for mounting in a patch panel aperture and comprising:
   (a) an adapter having a housing portion at its proximal end providing a cavity dimensioned and configured to seat a proximal end of a jack therein and having a channel portion at an end opposite said housing portion providing a channel leading into said cavity, said housing portion having a pair of arms extending from said proximal end of said cavity for passage into an aperture in the patch panel and engageable with the wall of the patch panel about the aperture to mount said adapter on the patch panel; and
   (b) a fiber management clip having
      (i) an engagement portion at its proximal end with a projecting arm engaged with said opposite end of said adapter, said engagement portion having side walls defining a recess for the distal end of the jack, said fiber management clip having
      (ii) a guidance portion at an end opposite said engagement portion with channels extending longitudinally thereof, said longitudinal channels being sized and dimensioned for seating of optical fibers therein and for guiding the optical fibers into the jack; and
      (iii) a latch on said guidance portion extending over said channels and engaged with said guidance portion to retain said fibers in said channels.

2. An optical fiber management module assembly in accordance with claim 1 wherein each of said pair of arms has a lip portion at the proximal end thereof, said lip portions extending in opposite directions and being engageable with the wall of the patch panel.

3. An optical fiber management module assembly in accordance with claim 1 wherein said housing portion has top, bottom and side walls and said pair of arms is disposed on said bottom and top walls.

4. An optical fiber management module assembly in accordance with claim 3 wherein at least one of said top wall and said bottom wall has slits extending therein from said proximal end thereof to provide flexure for the associated arm to facilitate insertion of said arm into the patch panel aperture.

5. An optical fiber management module assembly in accordance with claim 3 wherein said bottom wall of said housing portion has an arm extending distally therefrom for engagement with a jack seated therein.

6. An optical fiber management module assembly in accordance with claim 1 wherein said channel portion of said housing portion has a bottom wall and side walls and wherein said bottom wall has an aperture therein adjacent said distal end thereof and wherein said projecting arm of said fiber management clip has a lip thereon engageable in said aperture in said bottom wall.

7. An optical fiber management module assembly in accordance with claim 1 wherein said guidance portion of said fiber management clip is upwardly offset from said engagement portion.

8. An optical fiber management module assembly in accordance with claim 1 wherein said guidance portion of said fiber management clip has a generally horizontal portion adjacent said engagement portion and a downwardly inclined portion spaced therefrom.

9. An optical fiber management module assembly in accordance with claim 1 wherein said latch of said fiber management clip is integrally formed with said guidance portion.

10. An optical fiber management module assembly in accordance with claim 9 wherein said latch projects from one side of said guidance portion and is hinged to said one side and foldable over said channels.

11. An optical fiber management module assembly in accordance with claim 10 wherein said latch has a leg portion at its free end extending along the opposite side of said guidance portion, said leg portion having an aperture adjacent its free end, the opposite side of said guidance portion having a boss thereon which is frictionally seated in said aperture.

12. An adapter for mounting an optical fiber jack in a patch panel aperture and having:
    (a) a housing portion at one end providing a cavity dimensioned and configured to seat the proximal end of a jack therein, said housing portion having top, bottom and side walls;
    (b) a channel portion at the other end providing a channel leading into said cavity; and
    (c) a pair of arms on said housing portion extending forwardly from said end of said cavity for passage into an aperture in the patch panel and engageable with the wall of the patch panel about the aperture to mount said adapter on the patch panel, said pair of arms disposed on said bottom and top walls of said housing portion;
    wherein at least one of said top wall and said bottom wall has slits extending therein from said proximal end thereof to provide flexure for the associated arm and to facilitate insertion of said arm into the patch panel aperture.

13. The adapter for mounting an optical fiber jack in a patch panel aperture in accordance with claim 12 wherein each of said pair of arms has a lip portion at the proximal end thereof, said lip portions extending in opposite directions and being engageable with the wall of the patch panel.

14. The adapter for mounting an optical fiber jack in a patch panel aperture in accordance with claim 12, wherein said bottom wall of said housing portion has an arm extending distally therefrom for engagement with a jack seated therein.

15. The adapter for mounting an optical fiber jack in a patch panel aperture in accordance with claim 12, wherein said channel portion of said housing portion has a bottom wall and side walls and wherein said bottom wall has an aperture therein adjacent the distal end thereof.

16. A fiber management clip for use with an optical fiber jack and having:
    (a) an engagement portion at one end with side walls defining a recess for receiving the distal end of the jack;
    (b) a guidance portion at its other end with channels extending longitudinally thereof, said longitudinal channels being sized and dimensioned for seating of optical fibers therein and for guiding the optical fibers into the jack; and
    (c) a latch on said guidance portion extending over said channels and engaged with said guidance portion to retain said fibers in said channels.

17. The fiber management clip for use with an optical fiber jack in accordance with claim 16 wherein said guidance portion of said fiber management clip is upwardly offset from said engagement portion.

18. The fiber management clip for use with an optical fiber jack in accordance with claim 16 wherein said guidance portion of said fiber management clip has a generally horizontal portion adjacent said engagement portion and a downwardly inclined portion spaced therefrom.

19. A fiber management clip in accordance with claim 16 wherein said latch is integrally formed with said guidance portion.

20. A fiber management clip in accordance with claim 19 wherein said latch has a leg portion at its free end extending along the opposite side of said guidance portion, said leg portion having an aperture adjacent its free end, the opposite side of said guidance portion having a boss thereon which is frictionally seated in said aperture.

21. A fiber management clip in accordance with claim 19, wherein said latch includes a latch groove.

22. A fiber management clip in accordance with claim 16, wherein said guidance portion includes a generally horizontal portion adjacent said engagement portion and a downwardly inclined portion spaced therefrom, and wherein said channels are defined in said generally horizontal portion and said downwardly inclined portion.

* * * * *